Figure 1:
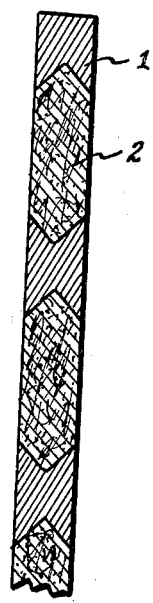

March 11, 1941.

C. F. HAUNZ 2,234,731

STORAGE BATTERY ELECTRODE

Filed April 13, 1937

INVENTOR.
CHARLES F. HAUNZ
BY
Allen & Allen
ATTORNEYS.

Patented Mar. 11, 1941

2,234,731

UNITED STATES PATENT OFFICE 2,234,731

STORAGE BATTERY ELECTRODE

Charles F. Haunz, Maywood, Ill., assignor to The Richardson Company, Lockland, Ohio, a corporation of Ohio Application April 13, 1937, Serial No. 136,639

6 Claims. (Cl. 136—9)

My present invention relates to the manufacture of storage batteries of the type employing grids, and in particular to the lead-acid types of electrical storage batteries. As is well known, it is now the current practice in manufacturing storage batteries of this type, to form a grid of lead alloy and then fill the interstices of this grid with active materials, usually in the form of oxides of lead or mixtures of oxides of lead. The grid, of course, has to be heavy enough to conduct the required electrical current; but since the active materials in the interstices of a grid are relatively very much less conductive than the grid itself, it will be clear that the size of the interspaces in the grid has to be kept down to a point where the current can be fairly efficiently drawn from the quantity of active materials involved. Thus the grids have to be much heavier than would otherwise be possible, and the amount of active materials, and therefore the capacity of the battery, has to be held down.

The principle of my present invention is the use in connection with active materials or materials adapted to form active materials of a substance which will act not only as a binder to prevent the washing away of such materials, but also will act as a means for rendering such materials very much more electrically conductive. By the employment of my invention, therefore, the capacity of an electric storage battery can be increased for a given size.

Briefly, in the practice of my invention, I mix with the active materials of a storage battery electrode, a quantity of metallic filaments. These metallic filaments are electrically conductive and are also made of material which is substantially unaffected by the electrolyte of the storage battery under electrolytic conditions. For use in a lead-acid type storage battery, antimonial lead, that is to say, lead containing sufficient antimony to render it substantially inert under electrolytic conditions, will be found a suitable material. Antimonial lead may be formed into metallic filaments which are exceedingly fine in a hair-like condition, by means and a method set forth in my co-pending application Serial No. 136,638 filed April 13, 1937, and entitled Storage batteries, and by mechanism essentially shown in the co-pending application of Adolph F. Krauss, Serial No. 96,124, filed August 14, 1936. The filaments as made in the Krauss apparatus are not, however, caught in water but are caught in a dry hopper, so that their surfaces remain chemically unaffected.

It is possible, for example, to produce lead or antimonial lead filaments which have high matting or cohering qualities and a very fine dimension, such that they are excellently adaptable to my invention. Thus, I have employed lead filaments or hairs which are on the average of a diameter of .003 to .007 inch, and of a length up to ¾ inch.

In the practice of my invention, I take these filaments of metal, which are inert to the storage battery electrolyte, and mix them in varying proportions with the active ingredients of the plates of an electric storage battery. These active ingredients are usually oxides of lead or mixtures of oxides of lead, or they may be the brown reactive powder of my application Serial No. 96,094, filed August 14, 1936. As a variant of this procedure, I may mix together a quantity of metal filaments which are inert to the storage battery electrolyte, together with a quantity of metallic filaments which are adapted to be converged into active ingredients under the electrolytic conditions which obtain in the use of an electric storage battery, and after the assembly of the battery as such, "form up" the plates, thereby converting the non-inert filaments in whole or in part into the desired active ingredients. As a still further variant, I may mix together a quantity of inert metallic filaments, a quantity of non-inert metallic filaments and a quantity of active materials, giving initially a storage battery which does not require an extended "forming" period, if any, but in which during the continued operation of the battery, the quantity of active material will be renewed or replenished by active materials derived from the non-inert metallic filaments.

It will be clear that to gain the object of my invention, it is necessary to employ an inert metal in filamentary form.

The fundamental objects of my invention as well as more specific ones which will be apparent to one skilled in the art, I accomplish by that procedure and by that certain structure and arrangement of parts of which I shall now describe certain exemplary embodiments. Reference may be had to the drawing wherein Figures 1-4 show different forms of storage battery electrode construction.

Figure 2:
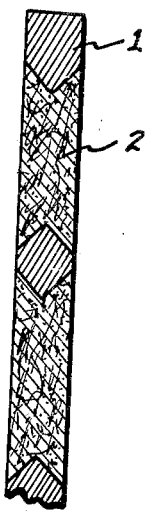
Figure 3:
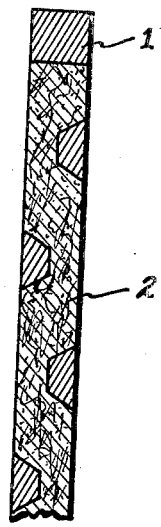

In Figures 1, 2 and 3, I have indicated a grid I, which is the conventional type support used in storage batteries and may be a cast structure of antimonial lead. 2 indicates the active material of the grid which may be formed in any of the ways set forth above. That is to say, I may take antimonial lead filaments, prepared as indicated, and mix these with the oxides to be employed in the plate and "paste" the plate with this mixture. In following this procedure, I secure an activated plate in which the mass of active compounds is bound together, and held from being washed away, by filamentary metal. Also the mass of active material is rendered conductive by the filamentary metal so that any given grid portion is able to draw current from a larger mass of active ingredients. Finally the intermixing of the metallic filaments gives greater strength to the mass.

Again the mass may be a mass of inert metallic filaments mixed with metallic filaments which are non-inert to the electrolyte under electrolytic conditions. Such a mass of mixed filaments may be very easily compacted in the grid of a plate, and also may be joined to the metal grid structure in any suitable way. Such a plate will be an unformed plate. It will be built into a storage battery and the storage battery will undergo forming operations whereby the non-inert metal will be converted into active chemical compounds.

Again I may make a mixture of non-inert metallic filaments and active materials, securing thereby a plate in which the active material will be replenished or increased by active materials formed when the non-inert filaments are attacked.

Yet again, I may make a mixture of inert metallic filaments, non-inert metallic filaments and active ingredients such as oxide, from which to make plates, securing thereby a plate in which the active material is permanently more conductive and will be replenished or increased by active materials formed when the non-inert filaments are attacked.

Figure 4:
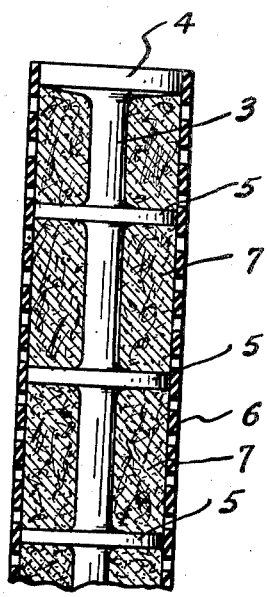

In Figure 4 I have shown a somewhat different form of electrode comprising a conductive member 3 having the terminal portion 4 and fins 5 at intervals. The spaces between these fins form the portion to be filled with active ingredients. The entire structure may be contained in a previous envelope of insulating or metallic substance indicated at 6. The active material is indicated at 7.

Modifications may be made in my invention without departing from the spirit of it.

Having thus described my invention, what I claim as new and desire to secure by Letters Patent is:

1. In a storage battery, an electrode comprising a conductive structure having interstices and a filling in said interstices comprising filamentary metal which is inert to storage battery electrolyte, filamentary metal which is not inert to storage battery electrolyte under electrolytic conditions, and active compounds for said electrode.

2. In an electric storage battery structure of the lead-acid type, an electrode comprising a conductive structure having interstices therein and a filling in said interstices comprising filaments of antimonial lead, filaments of substantially pure lead, and oxides of lead.

3. As an electrode ingredient in a lead-acid type storage battery, a mixture of filaments of antimonial lead, filaments of substantially pure lead, and oxides of lead.

4. A filling plate for the grids of lead-acid storage batteries, comprising oxides of lead and antimonial lead in filamentary form.

5. A filling paste for the grids of lead-acid storage batteries, comprising oxides of lead, antimonial lead in filamentary form, and substantially pure lead in filamentary form.

6. A storage battery electrode comprising a metallic grid having interstices, said interstices being pasted with a composition comprising oxides of lead and antimonial lead in filamentary form.

CHARLES F. HAUNZ.